(12) United States Patent
Knospe et al.

(10) Patent No.: US 9,355,375 B2
(45) Date of Patent: May 31, 2016

(54) LAUNCH OF TARGET USER INTERFACE FEATURES BASED ON SPECIFIC BUSINESS PROCESS INSTANCES

(76) Inventors: Holger Knospe, Wiesloch (DE); Joachim Fessler, Grafenberg (DE); Marianne Brosche, Heidelberg (DE); Jochen Mayerle, Flein (DE); Ulrich Keil, Heidelberg (DE)

( * ) Notice: Subject to any disclaimer, the term of this patent is extended or adjusted under 35 U.S.C. 154(b) by 1111 days.

(21) Appl. No.: 13/326,230

(22) Filed: Dec. 14, 2011

(65) Prior Publication Data
US 2013/0159898 A1 Jun. 20, 2013

(51) Int. Cl.
G06F 3/048 (2013.01)
G06Q 10/06 (2012.01)
G06Q 10/10 (2012.01)

(52) U.S. Cl.
CPC ............. *G06Q 10/06* (2013.01); *G06Q 10/103* (2013.01)

(58) Field of Classification Search
None
See application file for complete search history.

(56) References Cited

U.S. PATENT DOCUMENTS

| | | | |
|---|---|---|---|
| 5,819,103 A | 10/1998 | Endoh et al. | |
| 5,850,221 A | 12/1998 | Macrae et al. | |
| 5,877,766 A | 3/1999 | Bates et al. | |
| 6,065,009 A | 5/2000 | Leymann et al. | |
| 6,426,759 B1 | 7/2002 | Ting et al. | |
| 7,113,923 B1 | 9/2006 | Brichta et al. | |
| 7,280,793 B2 | 10/2007 | Zess et al. | |
| 7,606,803 B2 | 10/2009 | Bou-Ghannam et al. | |
| 7,711,694 B2 | 5/2010 | Moore | |
| 7,716,278 B2 | 5/2010 | Beringer et al. | |
| 7,735,022 B2 | 6/2010 | Danninger et al. | |
| 7,853,607 B2 | 12/2010 | Moore et al. | |
| 7,925,985 B2 | 4/2011 | Moore | |
| 7,925,994 B2 | 4/2011 | Olsen et al. | |
| 8,046,716 B2 | 10/2011 | Nelson | |
| 8,181,150 B2 | 5/2012 | Szpak et al. | |
| 8,261,233 B2 * | 9/2012 | Szpak et al. | ................... 717/105 |
| 8,332,405 B2 | 12/2012 | Wagenblatt et al. | |
| 8,468,491 B2 | 6/2013 | Markovic | |
| 8,621,421 B2 | 12/2013 | Klaka et al. | |
| 8,725,892 B2 | 5/2014 | Reese | |
| 2002/0128890 A1 | 9/2002 | Dick et al. | |
| 2003/0055668 A1 * | 3/2003 | Saran | ...................... G06F 9/465 705/301 |
| 2003/0154090 A1 | 8/2003 | Bernstein et al. | |
| 2003/0158832 A1 | 8/2003 | Sijacic et al. | |

(Continued)

OTHER PUBLICATIONS

"Object Interactions in Graphical Interface for Print Administration." *IBM Technical Disclosure*. Oct. 1996.
(Continued)

*Primary Examiner* — Stephen Alvesteffer
(74) *Attorney, Agent, or Firm* — Mintz Levin Cohn Ferris Glovsky and Popeo, P.C.

(57) ABSTRACT

A current use context can be extracted based on concrete data related to a currently displayed user interface feature in a business software architecture user interface environment. Relevant related business objects and transactional data for concrete instances of a process or scenario relevant to the current use context can be identified and a specific business object instance can be determined from a plurality of business object instances related to a specific current instance of the process or scenario relevant to the current use context. At least one target user interface feature associated with the process or scenario can be pre-populated with at least one parameter specific to a current data entry state of the specific current instance of the process or scenario and displayed via a user interface.

20 Claims, 6 Drawing Sheets

(56) References Cited

U.S. PATENT DOCUMENTS

| | | |
|---|---|---|
| 2003/0216928 A1 | 11/2003 | Shour |
| 2004/0010502 A1 | 1/2004 | Bomfim et al. |
| 2004/0030992 A1 | 2/2004 | Moisa et al. |
| 2004/0078258 A1 | 4/2004 | Schulz et al. |
| 2004/0102990 A1 | 5/2004 | Jones |
| 2004/0107414 A1 | 6/2004 | Bronicki et al. |
| 2004/0119752 A1 | 6/2004 | Beringer et al. |
| 2004/0181775 A1 | 9/2004 | Anonsen et al. |
| 2005/0004825 A1 | 1/2005 | Ehrler et al. |
| 2005/0086588 A1 | 4/2005 | McGregor et al. |
| 2005/0155000 A1 | 7/2005 | Weiler et al. |
| 2005/0262008 A1 | 11/2005 | Cullen et al. |
| 2006/0005140 A1 | 1/2006 | Crew et al. |
| 2006/0015383 A1 | 1/2006 | Beringer et al. |
| 2006/0074703 A1 | 4/2006 | Bhandarkar et al. |
| 2006/0074730 A1 | 4/2006 | Shukla et al. |
| 2006/0074736 A1 | 4/2006 | Shukla et al. |
| 2006/0074915 A1 | 4/2006 | Bhandarkar et al. |
| 2006/0149568 A1 | 7/2006 | Dreiling et al. |
| 2006/0206348 A1 | 9/2006 | Chen et al. |
| 2006/0206366 A1 | 9/2006 | Habib et al. |
| 2007/0156649 A1 | 7/2007 | Fischer |
| 2007/0162500 A1 | 7/2007 | Herwadkar |
| 2007/0192715 A1* | 8/2007 | Kataria et al. .................. 715/764 |
| 2007/0226038 A1 | 9/2007 | Das et al. |
| 2007/0233508 A1 | 10/2007 | Gillespie |
| 2007/0240046 A1 | 10/2007 | Yan et al. |
| 2007/0245300 A1* | 10/2007 | Chan et al. ..................... 717/105 |
| 2007/0265862 A1 | 11/2007 | Freund et al. |
| 2007/0271526 A1 | 11/2007 | Powley |
| 2007/0276714 A1 | 11/2007 | Beringer |
| 2008/0040191 A1 | 2/2008 | Chakravarty et al. |
| 2008/0052274 A1 | 2/2008 | Moore et al. |
| 2008/0052358 A1 | 2/2008 | Beaven et al. |
| 2008/0065668 A1* | 3/2008 | Spence et al. .................. 707/101 |
| 2008/0065675 A1 | 3/2008 | Bozich et al. |
| 2008/0077530 A1 | 3/2008 | Banas et al. |
| 2008/0140472 A1 | 6/2008 | Gilat et al. |
| 2008/0168376 A1 | 7/2008 | Tien et al. |
| 2008/0177622 A1 | 7/2008 | Akkiraju et al. |
| 2009/0006146 A1 | 1/2009 | Chowdhary et al. |
| 2009/0006150 A1 | 1/2009 | Prigge et al. |
| 2009/0070698 A1 | 3/2009 | Shurtleff et al. |
| 2009/0106640 A1 | 4/2009 | Handy et al. |
| 2009/0210268 A1 | 8/2009 | Fan et al. |
| 2010/0023531 A1* | 1/2010 | Brisebois ................ H04L 67/02 707/E17.032 |
| 2010/0082292 A1 | 4/2010 | Pantaleano et al. |
| 2010/0083374 A1 | 4/2010 | Schmitlin et al. |
| 2010/0121740 A1 | 5/2010 | Reed et al. |
| 2010/0185474 A1 | 7/2010 | Frank |
| 2011/0071869 A1 | 3/2011 | O'Brien et al. |
| 2011/0082721 A1 | 4/2011 | Arni et al. |
| 2011/0125756 A1 | 5/2011 | Spence et al. |
| 2011/0138340 A1 | 6/2011 | Holm-Petersen et al. |
| 2011/0145738 A1 | 6/2011 | Laugwitz et al. |
| 2011/0276358 A1* | 11/2011 | Sutton ........................... 705/7.14 |
| 2012/0059842 A1 | 3/2012 | Hille-Doering et al. |
| 2012/0090037 A1 | 4/2012 | Levit |
| 2012/0136693 A1 | 5/2012 | Patil et al. |
| 2012/0311451 A1 | 12/2012 | Beaven |
| 2013/0024795 A1 | 1/2013 | Robotham et al. |
| 2013/0159007 A1 | 6/2013 | Brosche et al. |
| 2013/0159034 A1 | 6/2013 | Herter et al. |
| 2013/0159036 A1 | 6/2013 | Keil et al. |
| 2013/0159037 A1 | 6/2013 | Keil et al. |
| 2013/0159047 A1 | 6/2013 | Mayerle et al. |
| 2013/0159060 A1 | 6/2013 | Steinbach |
| 2013/0159061 A1 | 6/2013 | Fessler et al. |
| 2013/0159063 A1 | 6/2013 | Fessler et al. |
| 2013/0159199 A1 | 6/2013 | Keil et al. |
| 2013/0159896 A1 | 6/2013 | Mayerle et al. |
| 2013/0159906 A1 | 6/2013 | Knospe et al. |
| 2013/0159907 A1 | 6/2013 | Brosche et al. |
| 2013/0159908 A1 | 6/2013 | Mayerle et al. |

OTHER PUBLICATIONS

Rockwell Automation, Arena Training Course (2005).

* cited by examiner

LAUNCH OF TARGET USER INTERFACE FEATURES BASED ON SPECIFIC BUSINESS PROCESS INSTANCES

CROSS-REFERENCE TO RELATED APPLICATIONS

The current application is related to the following co-pending and co-owned U.S. patent applications, the disclosure of each of which is incorporated herein in its entirety: application Ser. No. 13/326,270, filed Dec. 14, 2011, entitled "Business Process Guide and Record"; application Ser. No. 13/325,546, filed Dec. 14, 2011, entitled "Monitoring and Control of Business Processes and Scenarios"; application Ser. No. 13/325,605, filed Dec. 14, 2011, entitled "Runtime Generation of Instance Contexts Via Model-Based Data Relationships"; application Ser. No. 13/325,632, filed Dec. 14, 2011, entitled "Visualizing Business Processes or Scenarios in a Business Software Model Using Transit Maps"; application Ser. No. 13/326,026, filed Dec. 14, 2011, entitled "Displaying and Changing Scenario-Based or Process-Based business Configurations"; application Ser. No. 13/326,052, filed Dec. 14, 2011, entitled "Incorporating External Business Process Features Into a Scenario Visualization or Navigation Tool"; application Ser. No. 13/326,075, filed Dec. 14, 2011, entitled "Dynamic Business Scenario Key Performance Indicator Definitions, Real Time Calculations, and Analysis", application Ser. No. 13/326,190, filed Dec. 14, 2011, entitled "Dynamic Enhancement of Context Matching Rules for Business Scenario Models"; application Ser. No. 13/326,207, filed Dec. 14, 2011, entitled "Linear Visualization for Overview, Status Display, and Navigation Along Business Scenario Instances"; application Ser. No. 13/326,254, filed Dec. 14, 2011, entitled "Multilevel Visualization of Scenario Models and Scenario Instances"; application Ser. No. 13/326,261, filed Dec. 14, 2011, entitled "Process-Based User Authorization Management"; application Ser. No. 13/326,266, filed Dec. 14, 2011, entitled "Correlation-Based Dynamic Determination of Transactional Instance Contexts"; and Ser. No. 13/326,279, filed Dec. 14, 2011, entitled "Seamless Morphing from Scenario Model to System-Based Instance Visualization".

TECHNICAL FIELD

The subject matter described herein relates generally to enhancing user interaction with, and navigation among, features, functions, controls, and the like of an integrated software suite, such as for example an enterprise resource planning solution.

BACKGROUND

The complexity of business software architectures, such as for example enterprise resource planning (ERP) systems, can present substantial challenges to users and can be a serious obstacle to widespread operative use of business scenario or process models in the software landscape. Currently available business software architectures generally lack user interface capabilities to enable obtaining an overview of or navigating through the features and functionality along the concrete end-to-end business scenario the user is working on. Business scenario and process navigation features, such as for example those described in the related applications, can offer visualization of an end-to-end process.

SUMMARY

In one aspect, a method includes extracting a current use context based on concrete data related to a currently displayed user interface feature in a user interface environment of a business software architecture and identifying relevant related business objects and transactional data for concrete instances of a business process or business scenario that is relevant to the current use context. A specific business object instance is determined from a plurality of business object instances related to a specific current instance of the business process or business scenario relevant to the current use context, and at least one target user interface feature associated with the business process is displayed. The at least one target user interface feature is pre-populated with at least one parameter specific to a current data entry state of the specific current instance of the business process.

In some variations one or more of the following features can optionally be included in any feasible combination. The extracting can optionally be performed in response to a user selecting at least one first user interface feature in a navigation pane displayed in the business software architecture user interface environment. The at least one first user interface feature can optionally represent a business process feature of the business process or business scenario. The identifying further can optionally include enacting a object selection model that can optionally include a set of object selection rules. The object selection model can optionally consult a plurality of models defining business process features of a plurality of business scenarios in an organization-specific business configuration of an organization using the business software architecture. A status of at least one of the relevant related business objects can optionally be calculated based at least in part on current transactional data in data objects associated with the at least one of the relevant related business objects for the specific instance of the business process or business scenario. A set of user interface feature display rules that are defined at design time can optionally be applied to determine how to present the target user interface features. The use context can optionally include at least one of a current user interface environment being used or that has recently been used by a user, a role of the user; and a permission level of the user.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, a rule-based parameter selection and provisioning mechanism can be combined with manual, user-driven launch of one or more user interface features (e.g. a data or transaction entry screen, one or more elements launched on all or part of a user interface screen, etc.). In this manner, technical capabilities known from process or task engine driven environments can be transferred to the context of a purely user driven environment, with the technical adoptions necessary to cope with spontaneous user decisions. Implementations of the current subject matter are also capable of handling situations in which a same user interface feature is launched more than once. User interface features can be requested by a user to be launched for which parameter instances are not yet known (e.g. if the associated business process feature lies in the future of the current process instance), for which some or all parameter values are known but not yet fixed (e.g. if the associated business process feature is actively being worked on and receiving input data), or for which parameter instances must no longer be modified (e.g. if the associated business process feature occurred in the past, in a no-longer capable of being changed part of the business process or business scenario instance). In each of the use cases, modeled rules working on a full process or scenario context can derive a parameterization that complies with the logical requirements of the process or scenario and that makes sense to the user.

Further advantages can be realized in regards to object-based navigation (OBN), which can offer the possibility of performing different actions, navigation operations, or the like based on the attributes of one or more objects at the source of the navigation and one or more objects at the target of the navigation. The full data context of a business scenario or business process instance, which can be any number of object instances that participate in the business scenario or business process, can provide the input data upon which a set of rules is executed to identify the relevant objects. The underlying rules and relations governing the navigation behavior can be changed without writing any code, thereby enabling partners and customers to tailor process navigation behaviors to their needs without interfering with application code.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
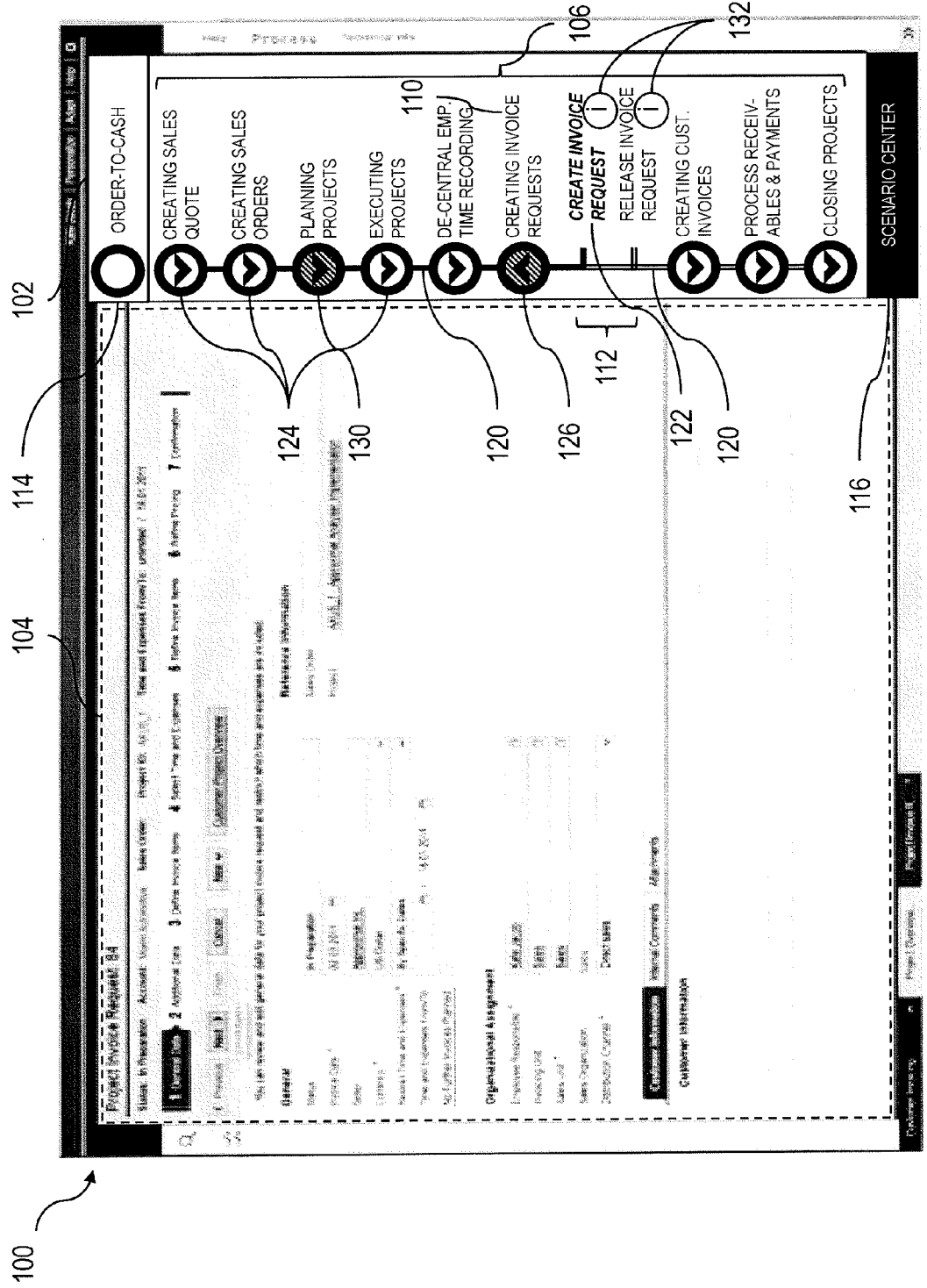
FIG. 1 shows a screenshot of a user interface illustrating a linear single business process view and associated user interface features for guided modification of aspects of a business process.

User tasks, activities, etc. performed in conjunction with completion of an instance of a business scenario or business process can each play a fixed role in a scenario or process model defining the business scenario or business process consistent with the business needs of an organization. The role of each of these tasks, activities, etc. can involve different ways for the user to interact with a given object, depending on the status of a specific business process feature or the business scenario or business process as a whole. For example, an "edit object" activity may require performance of different actions based on the existence or non-existence of the underlying object. If the object already exists, the task may be implemented as an "edit" function, but if the object does not exist, it should instead be implemented as a "create new" function. Values of certain attributes (e.g. a read-only flag) of an object can also imply different behavior (e.g a display only mode vs. an edit mode).

A business scenario navigation tool or feature set consistent with one or more implementations of the current subject matter can include the ability for a user to simply click on (or otherwise select) a user interface feature corresponding to a business process feature (e.g. a process step, a sub-process, a sub-process sub-step, a task, an activity, etc.) of a business scenario or business process in order to launch an associated application program, user interface work center view, transaction screen, or other user interface feature that provides an activity environment supporting completion of the selected business process feature. Further advantages can be achieved by not merely launching user interface features supporting a business process feature, but also by providing the proper parameters to that business process feature so that the supporting user interface features can be presented already prepopulated with already available data that are required by one or more business objects underlying the selected business process feature. One or more expected business objects, for example those matching the context of an identified currently active business scenario or business process instance, can, instead of showing a blank screen or some generic selection of objects in the system, include real data that has been previously entered in the association with an in-progress instance of the underlying business scenario or business process. By presenting an expected user interface feature or features (e.g. an expected screen, window, etc. with the expected functionality) with the expected object or objects preselected can provide the user the impression of a smooth navigation through the business scenario or business process instance.

A scenario landscape for an organization can refer to a set including all or some of the business scenarios and/or business processes characterizing an organization's operations. In general a business scenario can includes one or more business processes, process steps, or other business process features. Business process features can include, but are not limited to, one or more of business processes, process steps, sub-processes, tasks, activities, and the like. The business scenarios and business processes can be managed, and tasks relating to the completion of one or more steps of the business processes can be supported by, one or more feature modules of a business software architecture, such as for example an enterprise resource planning (ERP) system. The terms "instance of a business process," "instance of a business scenario," and similar descriptive terminology is intended to refer to a specific execution of a business process or a business scenario, respectively. For example, for a business scenario relating to sale of a product, each order taken and filled for that product can be considered as an instance of the business scenario. A business configuration can be a set of business scenarios including sets of business processes or business process features supported by the business software architecture and optionally customized to reflect the actual, real-life business functions (e.g. end-to-end business processes) performed by employees or other organization members on a recurring basis. A business configuration for an organization customer of a business software architecture is usually set up upon initial installation with occasional modifications or updates provided to reflect changes to the underlying real-life processes and procedures. Such a business configuration is typically constructed like a catalog, and its functions can be structured according to business areas, packages, topics and options. Once the initial business configuration is set up, all decisions are made, and the scoping is done, the business software architecture is ready for productive usage.

An application programming interface (API)-rich business system can offer the technical possibility to launch a floor plan with parameters. Navigation in currently available business software solutions is typically done only upon direct request of the user, for example via triggering by selecting navigation options from menus or by directly clicking the objects the user wants to have displayed. The underlying process engine can then open the correct application screen and provide the technical option to pass parameters along with the object, navigation target, etc. that the user has chosen.

Implementations of the current subject matter can enhance the choice of the parameters by identifying the correct values and objects that need to be passed to user interface features by using knowledge about the surrounding business scenario or business process as well as knowledge about the current scenario or process instance that includes business object instances that are logically related to the business case at hand. Based on one or more of scenario status, process status, and other attributes, the correct user interface features as well as the correct parameters/objects relating to the tasks, activities, etc. associated with any given business process feature of the business scenario or business process can be chosen from the scenario or process context without requiring that a user chooses the object.

Using a model-based approach according to implementations of the current subject matter, a scenario or process context can be mapped to any user interface features with any necessary parameters without writing any source code. The underlying rules and relations can be modeled, and the navigation behavior can be changed in a modeling tool without requiring the writing any code. Depending on a current status of a business scenario or business process instance, different activities may need to be triggered to enact a given business process feature. A navigator component can be provided to evaluate the status of a scenario or process instance and, depending on the outcome, trigger different actions within the underlying business software. A rule engine can be based on business scenario or business process instance information.

Implementations of the current subject matter can increase user efficiency by pre-filling a user interface (e.g. data input or modification fields in user screens or user interface elements displayed to a user) with correct parameter instances derived from a scenario or process context. Tedious selections by hand as the first activity to populate an empty or unspecifically populated user interface feature can also be eliminated. A user does not need to know names or identifiers for the different objects of a specific, current scenario or process instance. Instead, the system knows them and automatically passes the correct objects to the user interface features that implement the chosen activities. Navigation through an instance of a business scenario or business process can be greatly improved by ensuring that screen or user interface elements display the objects from the specific, current process instance context instead of an empty or a generic object selection.

More than one action or target user interface feature can be mapped to a given business process feature via a navigation tool such as is described herein. A single business process feature can thus point to more than one related user interface feature such that an action offered to a user is always appropriate for a current scenario or process instance status, which can significantly increase user efficiency.

A target user interface feature or set of features can be dynamically parameterized with data appropriate for the current scenario or process instance. The target determination can rely on the full scenario or process instance context, which can allow a much more precise and detailed parameterization than is typically possible with conventional approaches. User roles and authorizations can be used to influence the choice of the target user interface feature or set of features. Instead of bringing up a screen for which the user has no authorization, such conflicts can be detected ahead of time and the user can be offered an alternative navigation target, such as for example a read-only screen or a screen with a redacted level of detail corresponding to the level of detail for which the user is authorized.

Example of business rules that can be evaluated can include, but are not limited to, a "view activity" rule, in which if no related object exists a "create" action is called and the user is forwarded to a user interface feature or set of features via which the object can be created. If only one related object exists, the user can instead be forwarded to a user interface feature or set of features via which the read-only object is displayed in detail (e.g. as a "view" action). If more than one related object exists the user instead can be forwarded to a user interface feature or set of features via which all of the related objects are listed (e.g. as a "view list" action), and A "create/edit/modify" rule can include, if no related object exists, calling a "create" action and forwarding the user to a user interface feature or set of features via which the object can be created. If one related object exists the user, can instead be forwarded to a user interface feature or set of features via which the object is displayed and can be viewed (e.g. if the object has a read-only status) or edited (e.g. if the object has a write capability status for the user). User interface feature or a set of features can optionally additionally offers the possibility to create a new object. If more than one related object exists, the user can be forwarded to a user interface feature or set of features via which all of the related objects are listed (e.g. a "view list and create" action) and new objects can optionally be created as needed.

FIG. 1 illustrates an example of a user interface displaying a linear single scenario view 100, which shows a single business scenario as a linear sequence of business process features that can include process steps, sub-processes, tasks within sub-processes, and the like. The structure of the business scenario is condensed into a linear view, even though the actual flow of tasks and other actions necessary to complete an instance of the business scenario often involves explicit parallelism, decisions, loops, event driven changes in control flow, exceptions, and the like. Consistent with the scope of the current subject matter, any viable approach can be used to shape a business scenario into such a linear view.

As shown in FIG. 1 a navigation pane 102 and a work pane 104 are concurrently displayed. A plurality of first user interface elements 106 are displayed in the navigation pane 102 and arranged in a linear progression to represent the linear sequence of business process features in the scenario model of the currently actively business scenario. A first user interface element 110 corresponding to a business process having additional process steps or other business process features can be expanded as shown in FIG. 1 to display additional user interface elements 112 corresponding to the additional process steps or other business process features. Also as shown in FIG. 1, the currently displayed business scenario can be identified by one or more scenario identifier user elements 114. A scenario browser user interface element 116 can link to an upper level scenario landscape overview map to display a scenario landscape overview map showing intersections between scenarios and providing links to navigate to the other scenarios in the scenario landscape.

The first user interface elements 106 can be displayed in a manner similar to a transit route map with each business process and business process feature being represented like a stop on the route. In this manner, a familiar visual format can rapidly convey additional information about a current context within a specific instance of the business scenario as well as status information about the various business processes and other business process features along the "route" to completion of the instance. For example, a route line 120 connecting the "stops" can be presented with a first visual effect (e.g. color, brightness, shade, dots or dashes, etc.) up to the "stop" representing the business process feature that is currently selected with related functionality being provided in the work pane 104. The currently selected business process feature can be further indicated using textual or visual cues, such as for example color, shading, font, a highlighting box, etc. As a non-limiting example, the name of the business process feature displayed in conjunction with the user interface element 122 corresponding to the currently selected business process feature in FIG. 1 is formatted in a bold and italicized font. A different second visual effect can be used for the route line 120 leading to the "stops" past the currently selected business process feature. The icons 124 used to represent the "stops" in the navigation pane can also include visual cues to inform a user about status, other business process features that are included within the currently displayed business process feature user interface elements and that can be revealed by a user action to expand the route map, or the like.

Also in the example shown in FIG. 1, the expanded business process 110 is includes business process features that are illustrated by first user elements 112 incorporated directly into the route map without branching to maintain the linear progression of the scenario model. The first user interface element 126 representing the "stop" corresponding to this business process 110 can include visual presentation features to indicate that it is currently expanded as shown in FIG. 1. Additional first user interface elements 132 (e.g. the "m" icons shown in FIG. 1) can provide a link to a customization screen that can be displayed in the work pane 104 to allow a user to modify a link between a corresponding business process feature and second user interface elements to be displayed in the work pane 104 during execution of an instance of the business scenario.

Figure 2:
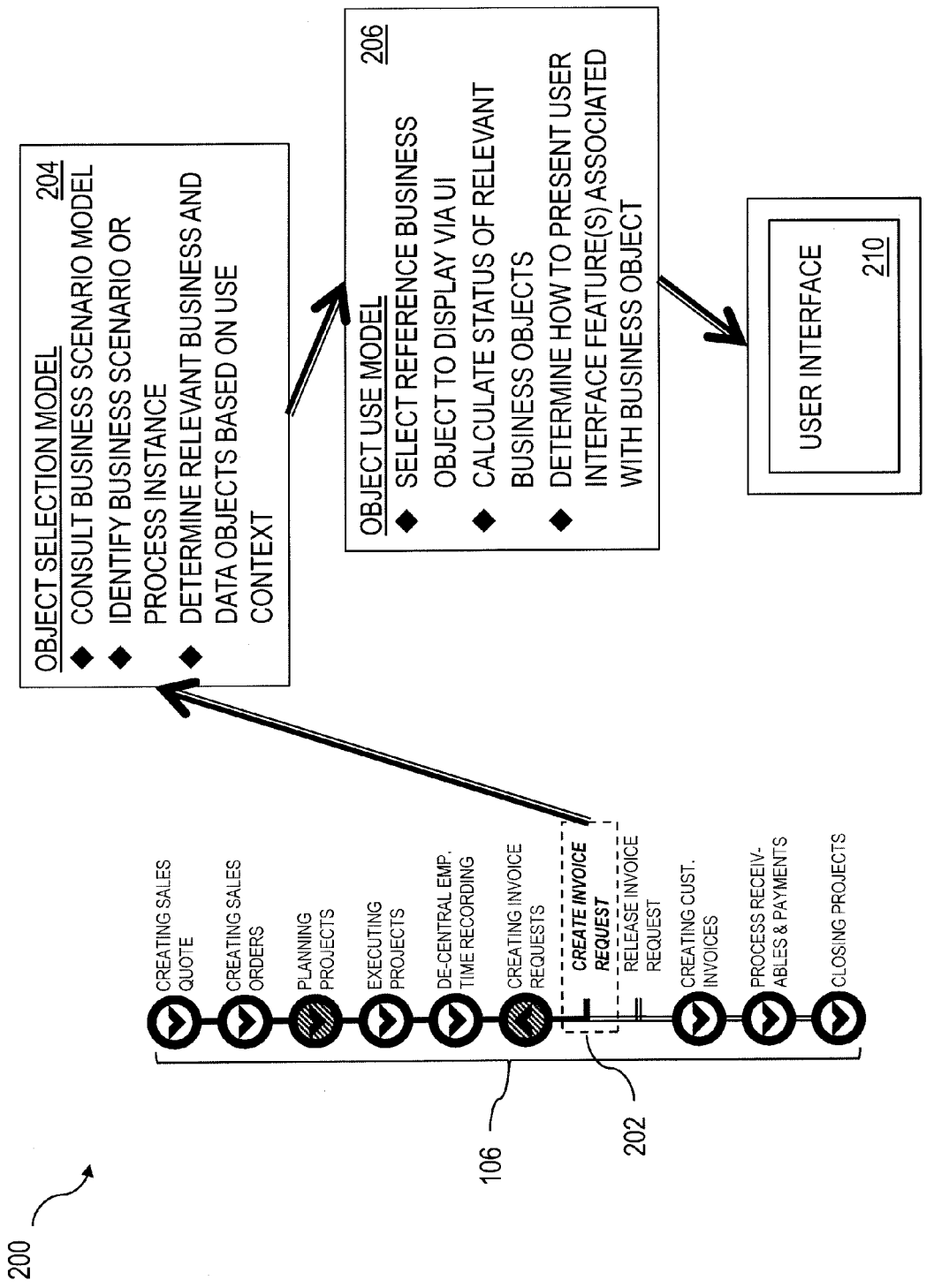
FIG. 2 shows a graphical representation of a process having aspects consistent with implementations of the current subject matter.

FIG. 2 shows a graphical depiction of features consistent with implementations of the current subject matter. A set of first user interface elements 106, for example in a navigation pane of a user interface as shown and described above in reference to FIG. 1, can receive a user selection of a specific business process feature 202 of a depicted business scenario. The selection can be performed by clicking, right clicking, pointing, tapping, keyboard navigation, etc. This selection can trigger an object selection model 204, which includes a set of rules, defined at design time to consult one or more business scenario or process models defining business process features of one or more business scenarios or business processes in an organization's organization-specific business configuration. The business scenario or process model or models, in conjunction with a current user context (e.g. what user interface environment the user is currently or recently has been working in, a user's role or permission level, etc.) can inform an identification of a specific instance of one of the business scenarios in the business configuration and determine other business object and data object instances that are relevant to the identified business scenario or business process instance.

The results from object selection model 204 can inform an object use model 206, which can select a reference business object upon which to base a target user interface feature or set of user interface features in response to the user selection of the business process feature 202. The object use model can also calculate statuses of the relevant business objects based on current data in their associated data objects for the specific instance of the business scenario or process. The object use model 206 can further determine how to present the target user interface features, for example using one or more sets of rules as explained above in reference to the sample rule set, which will be understood to represent only an illustrative and non-limiting example. Based on the results from the object use model 206, a the user interface view 210 can be presented to include the target user interface feature or set of user interface features associated with the reference business object.

Figure 3:
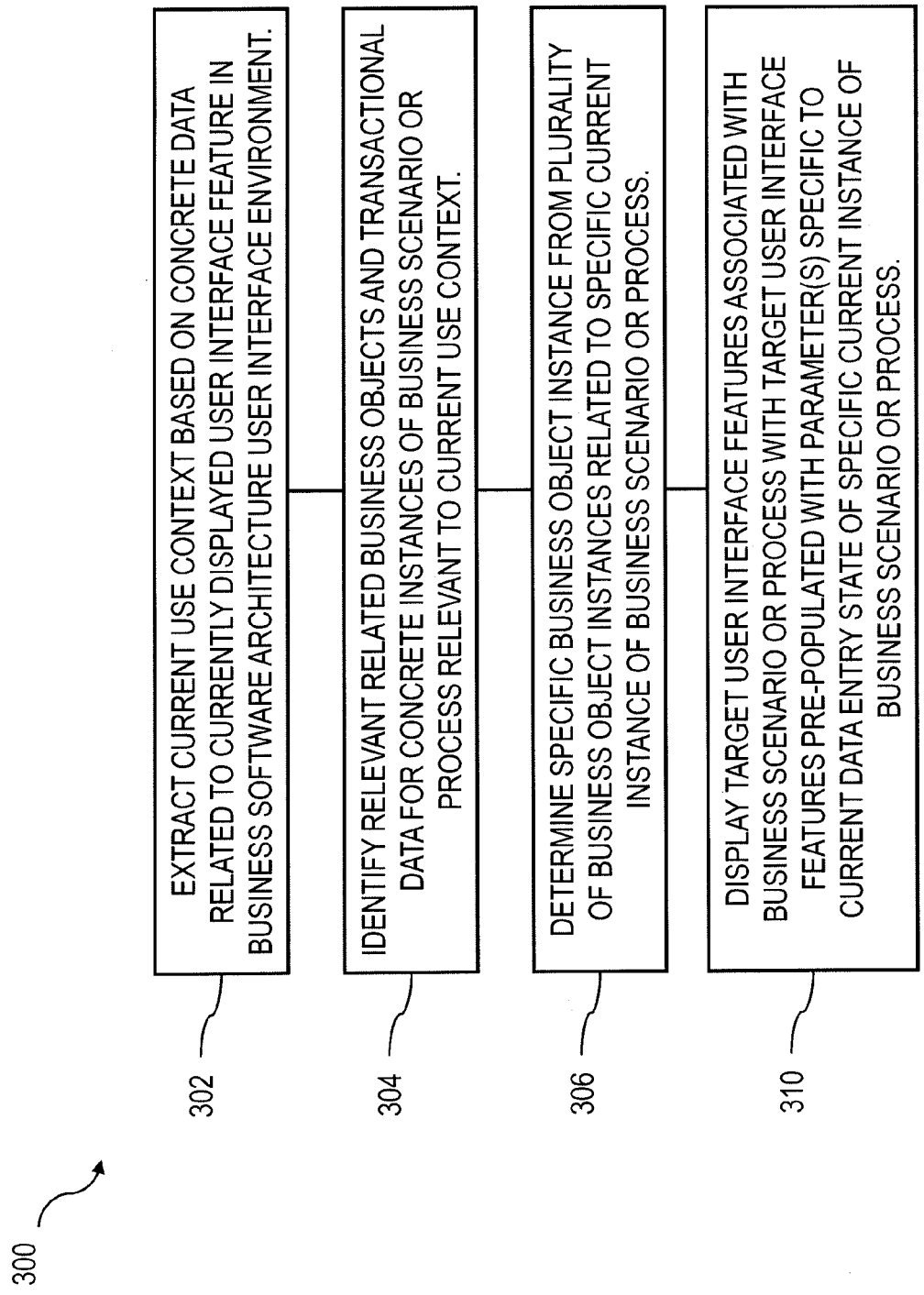
FIG. 3 is a process flow diagram illustrating aspects of a method having one or more features consistent with implementations of the current subject matter.

The process flow diagram 300 of FIG. 3 illustrates features consistent with one or more implementations of the current subject matter. At 302, a current use context is extracted based on concrete data related to a currently displayed user interface feature in a business software architecture user interface environment. At 304, relevant related business objects and transactional data for concrete instances of a business scenario, business process, or the like that is relevant to the current use context are identified, and at 306, a specific business object instance from a plurality of business object instances related to a specific current instance of the business scenario, business process, or the like relevant to the current use is determined. Target user interface features associated with the business scenario, business process, or the like are displayed at 310 with the target user interface features pre-populated with at least one parameter specific to a current data entry state of the specific current instance of the business scenario, business process, or the like.

Figure 4:
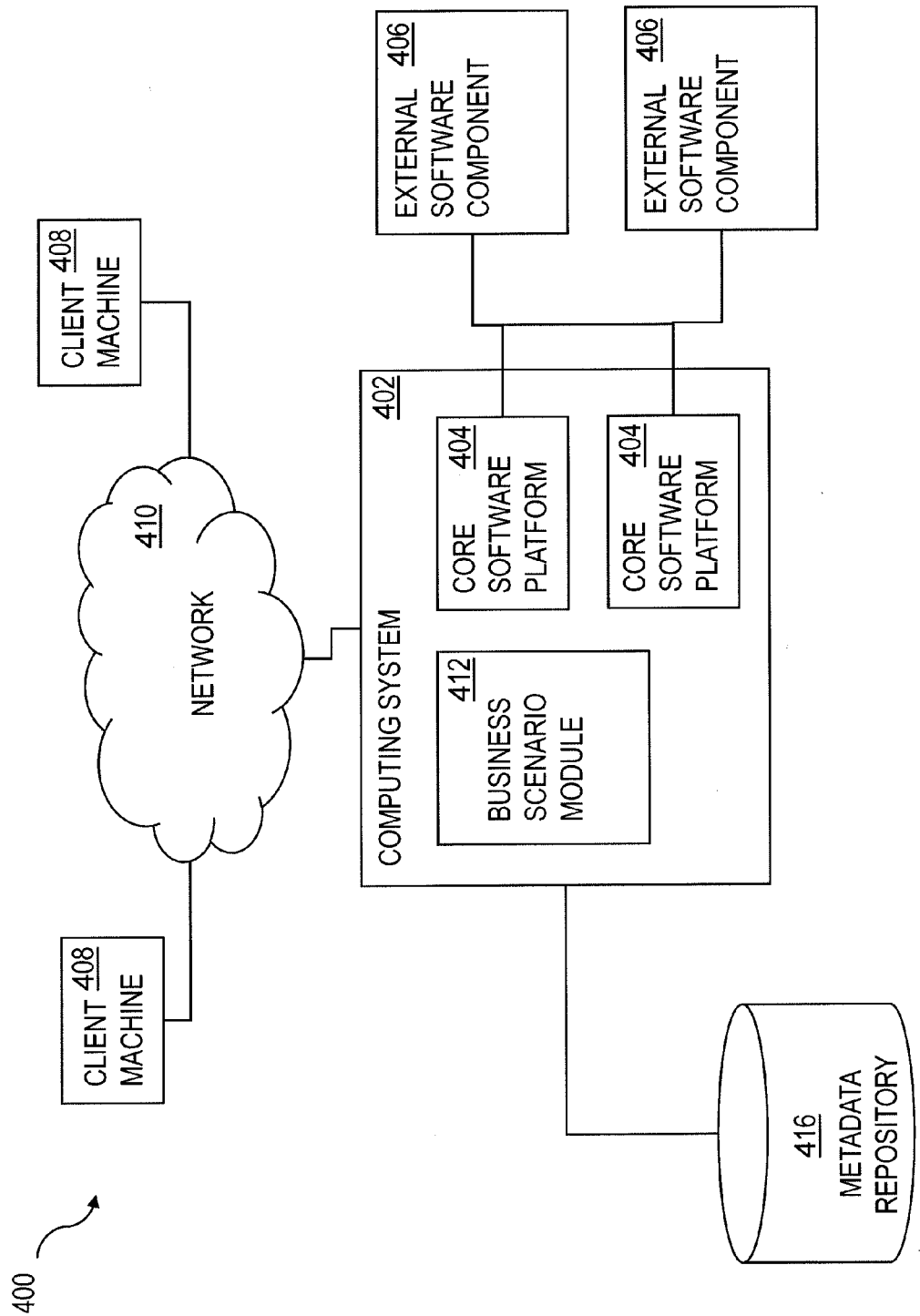
FIG. 4 is a diagram illustrating aspects of a system showing features consistent with implementations of the current subject matter.

The core software platform of an ERP or other business software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. FIG. 4 shows a diagram of a system consistent with such an implementation. A computing system 402 can include one or more core software platform modules 404 providing one or more features of the ERP system. The computing system can also aggregate or otherwise provide a gateway via which users can access functionality provided by one or more external software components 406, which can optionally be available from one or more service providers external to the one or more core software platform modules 404. Client machines 408 can access the computing system, either via a direct connection, a local terminal, or over a network 410 (e.g. a local area network, a wide area network, a wireless network, the Internet, or the like). A business scenario guidance and recording module 412 can be hosted on the computing system 402 or alternatively, on an external system accessible over a network connection. The business scenario guidance and recording module 412 can optionally include one or more discrete software and/or hardware modules that perform operations such as those described herein.

The business scenario guidance and recording module 412 can access one or more metadata repositories 416 and/or other data repositories that can store the definition of business processes and business configuration as well as data, metadata, master data, etc. relating to definitions of the business processes, the business configuration, and/or concrete instances of the data objects (e.g. business objects) that are relevant to a specific instance of the business process. In some examples, the definition can optionally be stored as a business object. In some implementations, the business object can include a template definition of a standard business process. The template definition that can optionally be modified via one or more extensions that are stored in the one or more metadata repositories 416.

Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a software delivery configuration in which services of an ERP system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 5:
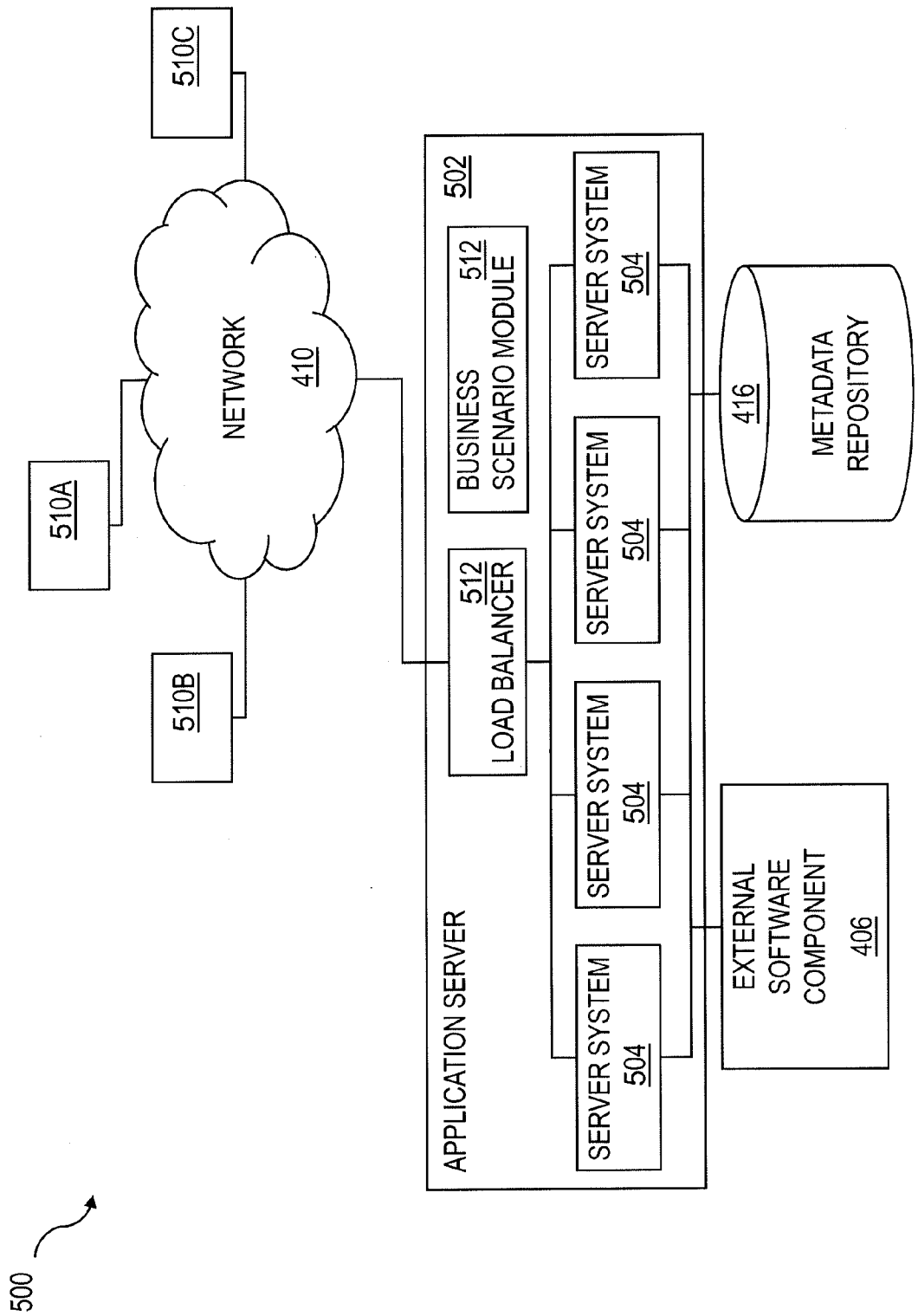
FIG. 5 is a diagram illustrating aspects of a system showing features consistent with implementations of the current subject matter.

FIG. 5 shows a block diagram of a multi-tenant implementation of a software delivery architecture 500 that includes an application server 502, which can in some implementations include multiple server systems 504 that are accessible over a network 410 from client machines operated by users at each of multiple organizations 510A-510C (referred to herein as "tenants" of a multi-tenant system) supported by a single software delivery architecture 500. For a system in which the application server 502 includes multiple server systems 504, the application server can include a load balancer 512 to distribute requests and actions from users at the one or more organizations 510A-510C to the one or more server systems 504. Instances of the core software platform 404 (not shown in FIG. 5) can be executed in a distributed manner across the server systems 504. A user can access the software delivery architecture across the network using a thin client, such as for example a web browser or the like, or other portal software running on a client machine. The application server 502 can access data and data objects stored in one or more data repositories 416. The application server 502 can also serve as a middleware component via which access is provided to one or more external software components 406 that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 502 that includes multiple server systems 504 that handle processing loads distributed by a load balancer 512. Potential benefits from such an arrangement can include, but are not limited to, high and reliably continuous application server availability and minimization of unplanned downtime, phased updating of the multiple server systems 504 to permit continuous availability (one server system 504 can be taken offline while the other systems continue to provide services via the load balancer 512), scalability via addition or removal of a server system 504 that is accessed via the load balancer 512, and de-coupled lifecycle processes (such as for example system maintenance, software upgrades, etc.) that enable updating of the core software independently of tenant-specific customizations implemented by individual tenants.

As in the example illustrated in FIG. 4, the metadata repository 416 can store a business object that represents a template definition of a standard business process. Each individual tenant 510A-510C can customize that standard template according to the individual business process features specific to business of the organization to which that tenant is assigned. Customizations can be stored as extensions in the metadata repository.

Figure 6:
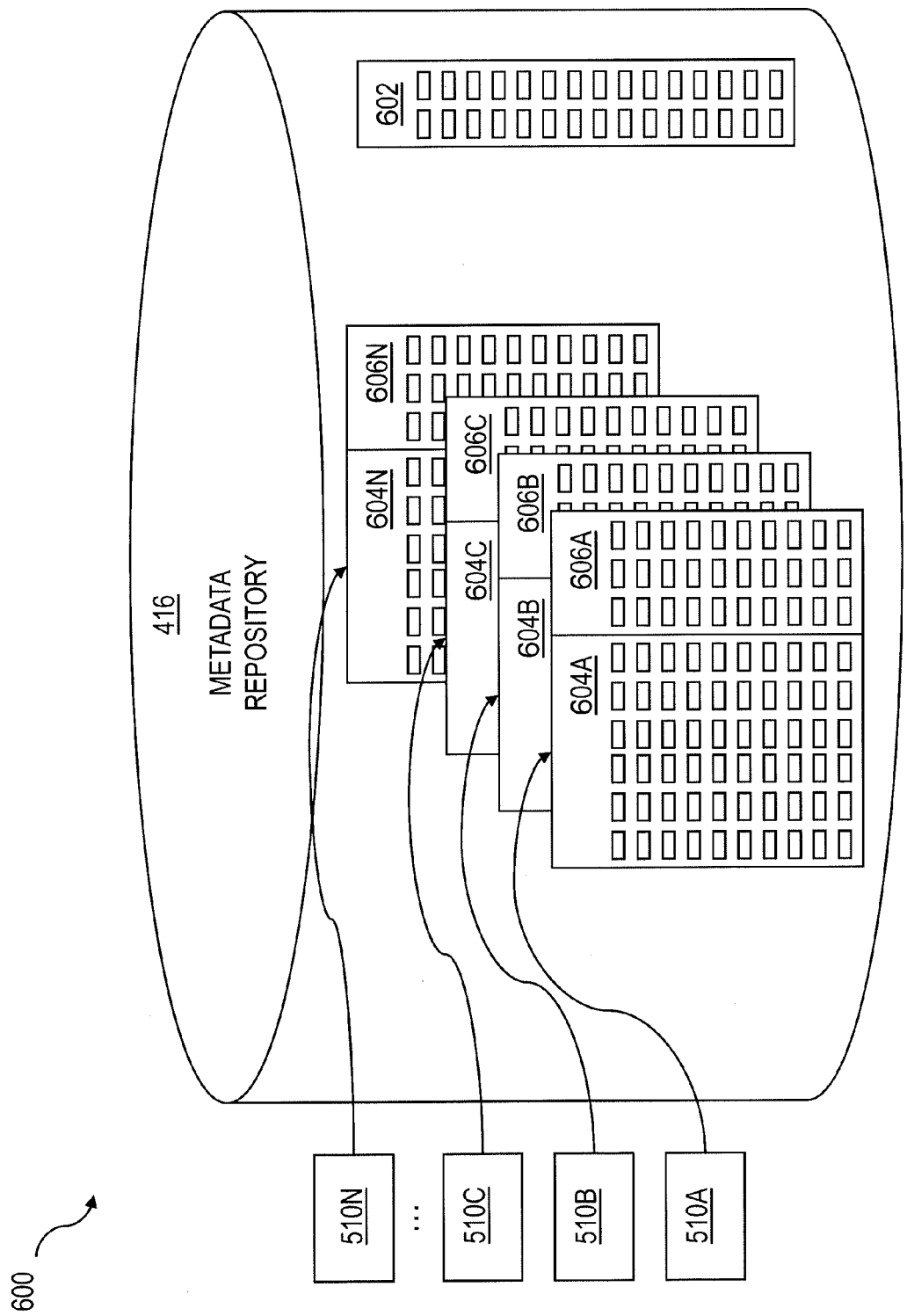
FIG. 6 is a diagram illustrating a data repository showing features consistent with implementations of the current subject matter.

To provide for customization of the business process for each of multiple organizations supported by a single software delivery architecture 500, the data and data objects stored in the metadata repository 416 and/or other data repositories that are accessed by the application server 502 can include three types of content as shown in FIG. 6: core software platform content 602 (e.g. a standard definition of a business process), system content 604 and tenant content 606. Core software platform content 602 includes content that represents core functionality and is not modifiable by a tenant. System content 604 can in some examples be created by the runtime of the core software platform and can include core data objects that store concrete data associated with specific instances of a given business process and that are modifiable with data provided by each tenant. The data retained in these data objects are tenant-specific: for example, each tenant 510A-510N can store information about its own inventory, sales order, etc. Tenant content 606A-606N includes data objects or extensions to other data objects that are customized for one specific tenant 510A-510N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 606 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 602 and system content 604 and tenant content 606 of a specific tenant are accessed to provide the business process definition and/or the status information relating to a specific instance of the business process according to customizations and business data of that tenant such that each tenant is provided access to a customized solution whose data are available only to users from that tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
    extracting a current use context based on concrete data related to a business process feature that is currently indicated in a user interface environment of a business software architecture;
    identifying relevant related business objects and transactional data for concrete instances of a business process or scenario that is relevant to the current use context;
    determining a specific business object instance from a plurality of business object instances related to a specific current instance of the business process or scenario relevant to the current use context; and
    displaying at least one target user interface feature associated with the business process or scenario, the at least one target user interface feature being pre-populated with at least one parameter specific to a current data entry state of the specific current instance of the business process or scenario.

2. A computer program product as in claim 1, wherein the operations further comprise performing the extracting in response to a user selecting at least one first user interface feature in a navigation pane displayed in the business software architecture user interface environment, the at least one first user interface feature representing a business process feature of the business process or scenario.

3. A computer program product as in claim 1, wherein the identifying further comprises enacting a object selection model that comprises a set of object selection rules, the object selection model consulting a plurality of business process or business scenario models defining business process features of a plurality of business processes or business scenarios in an organization-specific business configuration of an organization using the business software architecture.

4. A computer program product as in claim 1, wherein the operations further comprise calculating a status of at least one of the relevant related business objects, the calculating being based on current transactional data in data objects associated with the at least one of the relevant related business objects for the specific instance of the business process or scenario.

5. A computer program product as in claim 1, wherein the operations further comprise determining how to present the target user interface features by applying a set of user interface feature display rules that are defined at design time.

6. A computer program product as in claim 1, wherein the use context comprises at least one of a current user interface environment being used or that has recently been used by a user, a role of the user, and a permission level of the user.

7. A computer program product as in claim 1, wherein the at least one target user interface feature associated with the business process or scenario is displayed in a work pane concurrently with the business process feature, which is displayed in a navigation pane.

8. A system comprising:
   at least one programmable processor; and
   a machine-readable medium storing instructions that, when executed by the at least one processor, cause the at least one programmable processor to perform operations comprising:
   extracting a current use context based on concrete data related to a business process feature that is currently indicated in a user interface environment of a business software architecture;
   identifying relevant related business objects and transactional data for concrete instances of a business process or scenario that is relevant to the current use context;
   determining a specific business object instance from a plurality of business object instances related to a specific current instance of the business process or scenario relevant to the current use context; and
   displaying at least one target user interface feature associated with the business process or scenario, the at least one target user interface feature being pre-populated with at least one parameter specific to a current data entry state of the specific current instance of the business process or scenario.

9. A system as in claim 8, wherein the operations further comprise performing the extracting in response to a user selecting at least one first user interface feature in a navigation pane displayed in the business software architecture user interface environment, the at least one first user interface feature representing a business process feature of the business process or scenario.

10. A system as in claim 8, wherein the identifying further comprises enacting a object selection model that comprises a set of object selection rules, the object selection model consulting a plurality of business process or business scenario models defining business process features of a plurality of business processes or business scenarios in an organization-specific business configuration of an organization using the business software architecture.

11. A system as in claim 8, wherein the operations further comprise calculating a status of at least one of the relevant related business objects, the calculating being based on current transactional data in data objects associated with the at least one of the relevant related business objects for the specific instance of the business process or scenario.

12. A system as in claim 8, wherein the operations further comprise determining how to present the target user interface features by applying a set of user interface feature display rules that are defined at design time.

13. A system as in claim 8, wherein the use context comprises at least one of a current user interface environment being used or that has recently been used by a user, a role of the user, and a permission level of the user.

14. A computer-implemented method comprising:
   extracting a current use context based on concrete data related to a business process feature that is currently indicated in a user interface environment of a business software architecture;
   identifying relevant related business objects and transactional data for concrete instances of a business process or scenario that is relevant to the current use context;
   determining a specific business object instance from a plurality of business object instances related to a specific current instance of the business process or scenario relevant to the current use context; and
   displaying at least one target user interface feature associated with the business process or scenario, the at least one target user interface feature being pre-populated with at least one parameter specific to a current data entry state of the specific current instance of the business process or scenario.

15. A computer-implemented method as in claim 14, further comprising performing the extracting in response to a user selecting at least one first user interface feature in a navigation pane displayed in the business software architecture user interface environment, the at least one first user interface feature representing a business process feature of the business process or scenario.

16. A computer-implemented method as in claim 14, wherein the identifying further comprises enacting a object selection model that comprises a set of object selection rules, the object selection model consulting a plurality of business process or business scenario models defining business process features of a plurality of business processes or business scenarios in an organization-specific business configuration of an organization using the business software architecture.

17. A computer-implemented method as in claim 14, further comprising calculating a status of at least one of the relevant related business objects, the calculating being based on current transactional data in data objects associated with the at least one of the relevant related business objects for the specific instance of the business process or scenario.

18. A computer-implemented method as in claim 14, further comprising determining how to present the target user interface features by applying a set of user interface feature display rules that are defined at design time.

19. A computer-implemented method as in claim 14, wherein the use context comprises at least one of a current user interface environment being used or that has recently been used by a user, a role of the user, and a permission level of the user.

20. A computer-implemented method as in claim 14, wherein at least one of the extracting, the identifying, the determining, and the displaying is performed by at least one programmable processor.

* * * * *